(12) United States Patent
Yang et al.

(10) Patent No.: US 11,760,634 B2
(45) Date of Patent: Sep. 19, 2023

(54) METHODS FOR SYNTHESIZING METAL-CARBON COMPOSITE OF A CORE-SHELL STRUCTURE

(71) Applicant: City University of Hong Kong, Hong Kong (HK)

(72) Inventors: Yong Yang, Hong Kong (HK); Qing Yu, Hong Kong (HK); Jingyang Zhang, Hong Kong (HK); Tianyu Wang, Hong Kong (HK); Minhyuk Park, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 116 days.

(21) Appl. No.: 17/409,830

(22) Filed: Aug. 24, 2021

(65) Prior Publication Data

US 2023/0064413 A1    Mar. 2, 2023

(51) Int. Cl.
*C01B 32/15* (2017.01)
*C03C 17/38* (2006.01)
*B82Y 30/00* (2011.01)
*B82Y 40/00* (2011.01)

(52) U.S. Cl.
CPC .............. *C01B 32/15* (2017.08); *C03C 17/38* (2013.01); *B82Y 30/00* (2013.01); *B82Y 40/00* (2013.01); *C01P 2004/24* (2013.01); *C01P 2004/51* (2013.01); *C01P 2004/86* (2013.01); *C03C 2217/255* (2013.01); *C03C 2217/70* (2013.01); *C03C 2218/116* (2013.01); *C03C 2218/154* (2013.01); *C03C 2218/328* (2013.01); *C03C 2218/355* (2013.01)

(58) Field of Classification Search
CPC ... C01B 32/15; C03C 17/38; C03C 2217/255; C03C 2217/70; C03C 2218/116; C03C 2218/154; C03C 2218/328; C03C 2218/355; B82Y 30/00; B82Y 40/00; C01P 2004/24; C01P 2004/51; C01P 2004/86
See application file for complete search history.

(56) References Cited

PUBLICATIONS

Yu, et al., Transofmation of Freestanding Carbon-Containing Gold Nanosheets in Au Nanoparticles Encapsulated within Amorphous Carbon: Implications for Surface Modification of Complex-Shaped Materials and Structures, ACS Appl. Nano Mater. 2021; 4: 5098—2105 with Supporting Information (Year: 2021).*

(Continued)

*Primary Examiner* — Daniel C. McCracken
(74) *Attorney, Agent, or Firm* — Idea Intellectual Limited; Margaret A. Burke; Sam T. Yip

(57) ABSTRACT

The present invention provides a metal-carbon composite of a core-shell structure and a method of synthesizing the same. The method includes preparing a first polymer-covered glass substrate with a nano-thickness metal film deposited thereon; immersing the first polymer-covered glass substrate with the metal film to delaminate one or more 2D freestanding organic-metal nanosheets from the first polymer-covered glass substrate; transferring the one or more 2D freestanding organic-metal nanosheets onto a second target substrate; and annealing the one or more 2D freestanding organic-metal nanosheets to decompose an organic portion of the organic-metal nanosheet into an amorphous carbon-containing shell forming a metal-carbon nanocomposite of a core-shell structure.

19 Claims, 14 Drawing Sheets

(56) References Cited

PUBLICATIONS

Definition of surround, accessed online at: https://www.merriam-webster.com/dictionary/surround on Jul. 26, 2023 (Year: 2023).*

Dai, et al., Carbon-encapsulated metal nanoparticles deposited by plasma enhanced magnetron sputtering, Vacuum 2018; 150: 124-128 (Year: 2018).*

Qing Yu et al., "Transformation of Freestanding Carbon-Containing Gold Nanosheets into Au Nanoparticles Encapsulated within Amorphous Carbon: Implications for Surface Modification of Complex-Shaped Materials and Structures", American Chemical Society Publications, Apr. 29, 2021.

* cited by examiner

METHODS FOR SYNTHESIZING METAL-CARBON COMPOSITE OF A CORE-SHELL STRUCTURE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a metal-carbon composite of a core-shell structure and a method of synthesizing the same.

BACKGROUND OF THE INVENTION

Gold (Au) nanoparticles, as catalysis and surface-enhanced Raman scattering-active plasmonic substrates, have been extensively investigated within the last 40 years. Freestanding gold (Au) nanosheets with a nanoscale thickness, also termed as 2D Au in the literature of 2D metals, have attracted considerable research interest for their applications in catalysis, photoelectronics, and biomedicine. As a result of the high surface-to-volume ratio, Au nanosheets contain much more low-coordinated surface atoms than their bulk counterparts. Consequently, the active sites offered by Au nanosheets are abundant in various electrochemical reactions, which can lead to exceptionally high catalytic activities in CO oxidation or selective oxidation of C—H bonds. Meanwhile, the high surface-to-volume ratio also endows Au nanosheets with unique shape-dependent optical properties due to the collective oscillations of conduction electrons on their surface, a phenomenon known as "surface plasmon resonance", which can result in high absorptions that can be extended to the near-infrared (NIR) region and hence suitable for applications in biomedical diagnostics and biosensors.

However, in theory, metallic nanosheets with excessive surface atoms are thermodynamically unfavorable, which can reduce their free energy by minimizing their surface area. Consequently, the properties of Au nanosheets can be readily "degraded" after thermal heating or irradiation by electron beams.

It was discovered that thermal stability of metallic nanostructures, such as 0D nanoparticles and 1D nanorods, could be enhanced via encapsulation with an appropriate "shell" material, such as carbon, silica, and metal oxide. The presence of the shell can hinder the diffusion of surface atoms even at elevated temperatures, therefore isolating the "core" material for protection. However, fabrication of encapsulated nanoparticles was not straightforward, which usually involved multi-step chemical reactions following physical deposition or electron beam irradiation.

Therefore, there is a need in the art to provide an easy and scalable method to fabricate metal nanoparticles encapsulated with a protection layer.

SUMMARY OF THE INVENTION

One objective of the present invention is to provide a simple yet efficient method for the scalable production of crystalline gold (Au) nanoparticles encapsulated by amorphous carbon.

In accordance to one aspect of the present invention, the present invention provides a method for synthesizing a metal-carbon composite of a core-shell structure. The method includes: preparing a first polymer-covered glass substrate with a nano-thickness metal film deposited thereon; immersing the first polymer-covered glass substrate with the metal film to delaminate one or more 2D freestanding organic-metal nanosheets from the first polymer-covered glass substrate; transferring the one or more 2D freestanding organic-metal nanosheets onto a second target substrate; and annealing the one or more 2D freestanding organic-metal nanosheets to decompose an organic portion of the organic-metal nanosheet into an amorphous carbon-containing shell forming a metal-carbon nanocomposite of a core-shell structure.

In accordance to one embodiment, the polymer used in the first polymer-covered glass substrate including PVA.

In accordance to one embodiment, the second target substrate includes a planar substrate or a non-planar substrate.

In accordance to another embodiment, the planar substrate includes silicon, fused silica, glass, or sapphire.

In accordance to yet another embodiment, the non-planar substrate includes an anodized alumina oxide (AAO) plate and Mo grid.

In accordance to one embodiment, the metal film is a gold (Au) film.

In accordance to one embodiment, the method of preparing a first polymer-covered glass substrate with a nano-thickness metal film deposited thereon further including: dissolving a polymer powder into deionized water to form a polymeric hydrogel with the mass fraction of 5% to 15%; spin-coating the polymeric hydrogel on a glass substrate until the surface of the glass substrate is uniformly covered to obtain a first polymer-covered glass substrate; placing the first polymer-covered glass substrate in a drying oven for dehydration at 80° C. for 1 hour and air-cooling to room temperature; and depositing a metal film on the first polymer-covered glass substrate.

In accordance to another embodiment, the metal film is deposited on the first polymer-covered glass substrate via a physical vapor deposition method comprising magnetron sputtering, electron beam, ion-beam evaporation and thermal evaporation.

In accordance to yet another embodiment, the thickness of the metal film is in a range of 10 nm to 60 nm.

In accordance to another embodiment, the temperature on the first polymer-covered glass substrate is kept below 100° C.

In accordance to one embodiment, the method of transferring the one or more 2D freestanding organic-metal nanosheets onto a second target substrate further including preparing a second target substrate; and salvaging the one or more 2D freestanding organic-metal nanosheets out of the water with the second target substrate.

In accordance to one embodiment, the first polymer-covered glass substrate with the metal film is immersed into a fluid such as deionized water.

In accordance to one embodiment, the second target substrate with one or more 2D freestanding organic-metal nanosheets is put into a heating equipment for annealing.

In accordance to another embodiment, the heating equipment comprises muffle furnace.

In accordance to one embodiment, the one or more 2D freestanding organic-metal nanosheets are annealed at a heating rate of 10° C./min in the air and cooled down in the heating equipment. The annealing time is in a range of 30 to 600 minutes, and the annealing temperature is in a range of 300 to 900° C.

A second aspect of the present invention provides a metal-carbon composite of a core-shell structure, where a metal nanoparticle constitutes a core and an amorphous carbon-containing phase having a thickness of approximately 2 nm or less constitutes a shell, and the shell surrounds a portion or the entirety of the core.

A third aspect of the present invention provides a substrate selected from a porous metal grid, a (porous) ceramic plate, a silicon substrate, a fused silica substrate or a glass substrate having a uniform dispersion of the metal-carbon composite formed thereon.

In accordance to one embodiment, the size distribution of the metal-carbon composite of a core-shell structure is in a range of 20 to 800 nm.

Compared to the traditional methods for the synthesis and deployment of nanoparticles, the metal-carbon composite of a core-shell structure made by the present method have the following advantages:
(1) the present method allows deploying nanoparticles on various materials regardless of their surface topologies (e.g., planar, rough, or porous surfaces), which are attractive for the surface modification of complex-shaped materials and structures, such as electrodes in energy related applications and biosensors in the surface-enhanced Raman scattering;
(2) the size of the metal-carbon core-shell nanoparticles is from tens to hundreds of nanometers, which can be easily adjusted by altering the sheet thickness, annealing temperature and time. For a particular substrate, it only takes about one month to find the optimal parameters for preparing nanoparticles with the desired size distribution;
(3) The formed core-shell nanoparticles exhibit enhanced thermal stability, which is suitable for applications in high-temperature catalysis and biomedical therapeutics;
(4) the present method can be extended to other noble metals, e.g., silver (Ag) and platinum (Pt), forming noble metal-carbon core-shell nanoparticles; and
(5) the prepared core-shell structure is safe and low-cost and can be mass-produced.

BRIEF DESCRIPTION OF THE DRAWINGS

Embodiments of the invention are described in more details hereinafter with reference to the drawings, in which.

DETAILED DESCRIPTION

In the following description, the present invention addressed above issues through the use of simple and scalable fabrication methods under its various embodiments. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present method allows for the synthesis of amorphous carbon-encapsulated metal nanoparticles with a controlled size. An exemplary core-shell nanoparticle formed according to the present invention is shown in FIG. 3C. A thin shell of approximately 2 nm includes amorphous carbon and surround a metal core of approximately 25-60 nm. In the method described below freestanding nanosheets can be easily transferred to various planar or non-planar substrates, which facilitate the fabrication of complex-shaped electrode and biosensor materials by decomposing the polymer portions of nanosheets for surface modification, forming coreshell structures.

Figure 1:
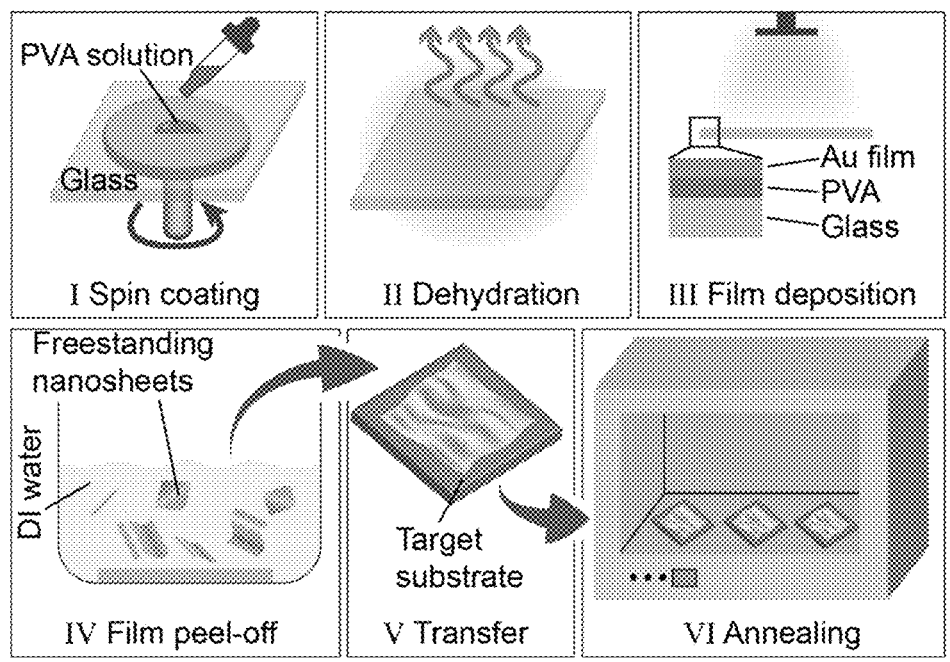
FIG. 1 depicts a schematic diagram of synthesizing a metal-carbon composite of a core-shell structure.

In the inventive method, a metal nanosheet is formed on polymer-covered glass substrate. The metal nanosheet is delaminated from the polymer-covered glass substrate through immersion in a fluid. The delaminated nanosheet is transferred onto a second target substrate that includes a polymer precursor for the shell layer. The organic-metal nanosheet are heated to decompose the organic material to form an amorphous carbon-containing shell that surrounds the metal nanocore. The amorphous-carbon-containing shell is approximately 2 nm thick or less on a core having an average size of approximately 42 nm Turning to FIG. 1A, a method is depicted in detail for synthesizing a metal-carbon composite of a core-shell structure. In FIG. 1, the method is for the production of crystalline gold nanoparticles encapsulated by amorphous carbon; however, other encapsulated metal nanoparticles may be formed using the same technique.

Step I—PVA solution was spin coated on a glass substrate until it can fully and uniformly cover the surface of the glass substrate to form a PVA-covered glass substrate;

Step II—the prepared PVA-covered glass substrate was dehydrated in a drying oven at 80° C. for 1 hour and air-cooled to room temperature;

Step III—a gold film was then deposited onto the PVA-covered glass substrate through a variety of physical vapor deposition methods (e.g., magnetron sputtering, electron beam and ion-beam evaporation, thermal evaporation, etc.) to fabricate a PVA-gold film. The gold film is deposited to a thickness of approximately 10-60 nm During the deposition, the temperature on the substrate should be kept less than 100° C. to avoid the degradation of PVA substrate;

Step IV—the substrate with PVA-gold film was immersed into deionized water at room temperature for 5 to 30 minutes, depending on the thickness of metal film. Due to polymer surface buckling-induced exfoliation, organic-gold nanosheets can delaminate from the substrate spontaneously and form 2D freestanding organic-gold nanosheet. That is, a portion of the PVA substrate accompanies the gold nanosheet to form the composite organic-gold nanosheet. As will be discussed in further detail below deposition of Au onto PVA can lead to the formation of a subsurface Au-organic layer and even partial carbonization of the PVA. After delamination, the deionized water was replaced to remove the dissolved PVA;

Step V—the organic-gold nanosheets was then transferred onto a target substrate and put into a muffle furnace. The substrate is expected to include, but not limit to, planar silicon, glass, sapphire substrate, and non-planar anodized alumina oxide (AAO) plate; and Step VI—the target substrate with the organic-gold nanosheets was placed onto a glass tube and annealed with a heating rate of 10° C./min in the air and cooled down with the muffle furnace (L 3/11 type, Nabertherm) to fabricate the gold-amorphous carbon composite as a core-shell structure.

The target temperature and time depend on the thickness of nanosheets, such as at 350° C. for 30 minutes for thickness=20 nm.

In one embodiment, the PVA solution was prepared by adding commercial PVA powder (purchased from Shandong Usolf Chemical Technology with the grade of 0588) into deionized water, and the PVA hydrogel has a mass fraction of 5-15%.

In one embodiment, when preparing the 2D freestanding organic-metal nanosheets, the structure of the organic layer in the exfoliated organic-metal sheets is different from the pristine PVA polymer, which assists is preparing the core-shell nanoparticles. This is particularly true for high-energy deposition processes such as sputtering as the energy of the metal particle impacting the polymer can cause structural changes and partial carbonization.

In one embodiment, the water flowing was kept gently during delamination to maintain the integrity of the nanosheets. Further, in order to speed up delamination, the film can be cut into some small rectangles, or the deionized water can be heated to 40-50° C.

Figure 2A:
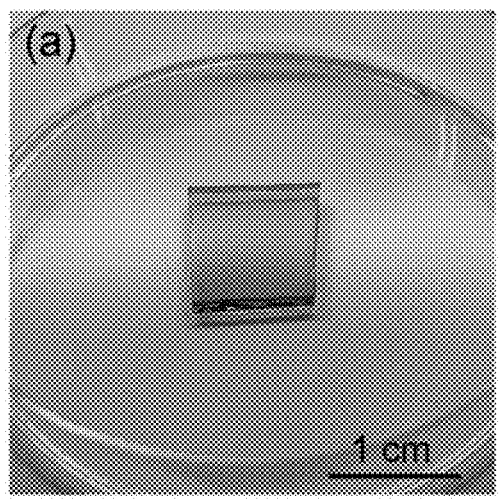
FIG. 2A shows a photograph of a prepared PVA-gold film on a glass substrate in accordance with one embodiment of the present invention.
Figure 2B:
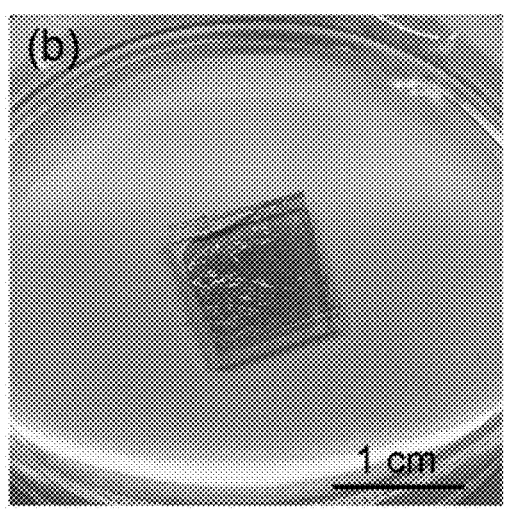
FIG. 2B shows a photograph of a large-area freestanding organic-gold nanosheet (thickness=20 nm) suspending in DI water.
Figure 2C:
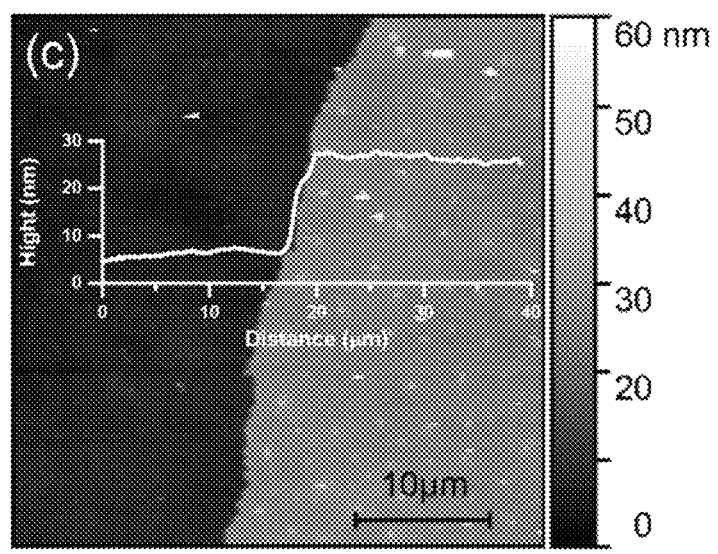
FIG. 2C depicts an AFM mapping image and thickness profile of the organic-gold nanosheets transferred onto a silicon substrate (thickness=20 nm) in accordance with one embodiment of the present invention.
Figure 2D:
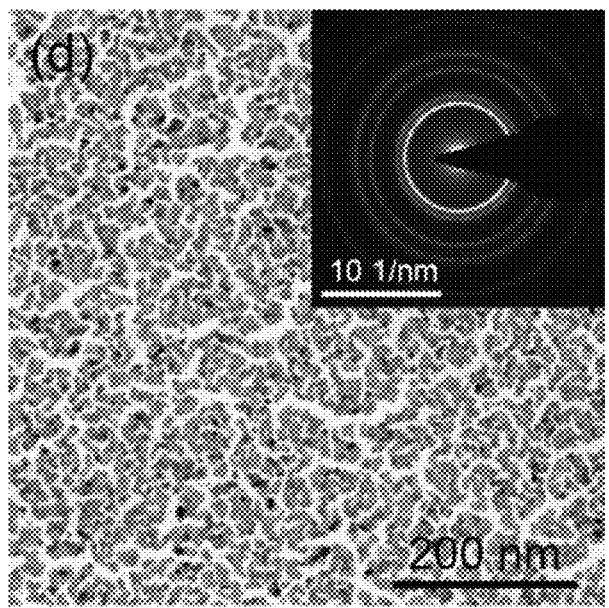
FIG. 2D depicts an TEM image and corresponding selected-area electron diffraction of the organic-gold nanosheets (thickness=20 nm) in accordance with one embodiment of the present invention.
Figure 2E:
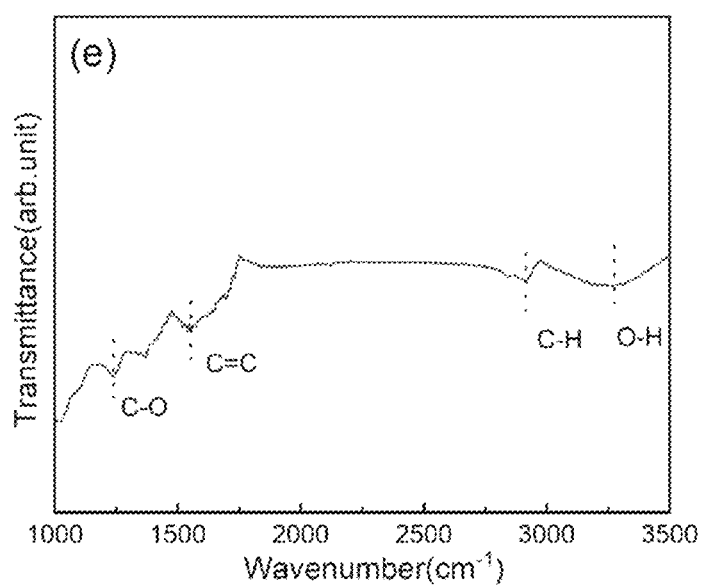
FIG. 2E depicts a FTIR spectra of the organic-gold nanosheets (thickness=20 nm) in accordance with one embodiment of the present invention.

In one embodiment, FIG. 2A shows a photograph of a PVA-gold film on glass substrate, and FIG. 2B shows a photograph of the 2D freestanding organic-gold nanosheets floating on surface of the deionized water, which appears half-opaque and greenish. According to the AFM height image, the collected organic-gold nanosheets transferred onto a silicon substrate has a uniform thickness of approximately 20 nm (FIG. 2C). Subsequently, corresponding selected-area electron diffraction of the 20 nm-thick organic-gold nanosheets was also conducted by TEM, as shown in FIG. 2D. FIG. 2E is the FTIR pattern, showing the presence of broken PVA molecular structures.

Figure 3A:
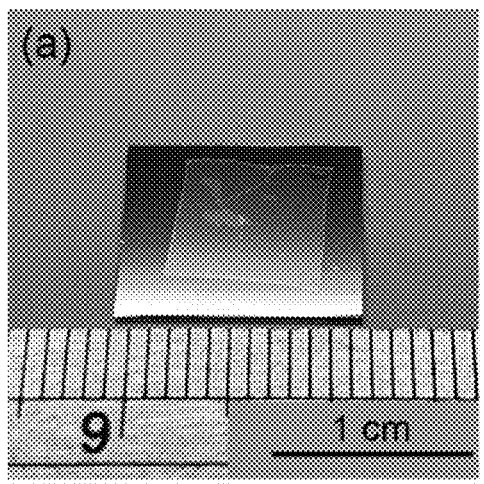
FIG. 3A shows a photograph of organic-gold nanosheets transferred onto a silicon substrate.
Figure 3B:
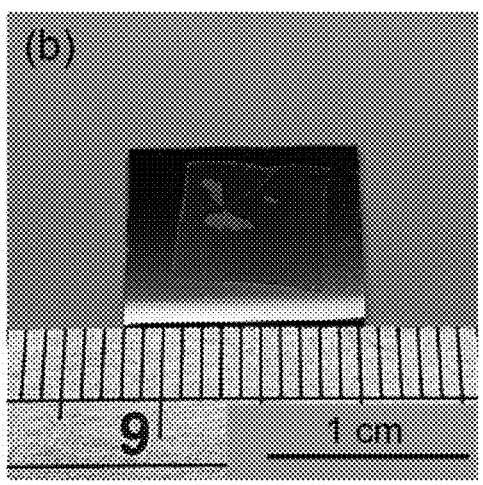
FIG. 3B shows a photograph of a nanosheet after annealing at 350° C. for 30 minutes.
Figure 3C:
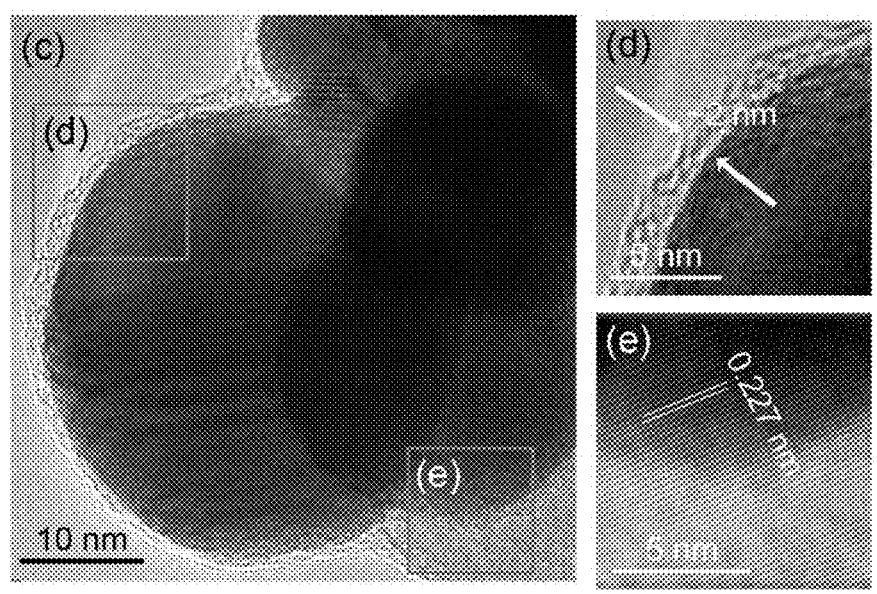
FIG. 3C depicts a high resolution TEM image of the FCC gold-amorphous carbon core-shell nanoparticles in accordance with one embodiment of the present invention, in which (d) and (e) are two separate enlarged views of boxed areas.

In one embodiment, FIGS. 3A and 3B show a 20 nm-thick organic-gold nanosheet on the 1 cm×1 cm silicon substrate before and after annealing, respectively. The annealing conditions are at 350° C. for 30 minutes. After annealing, the as-fabricated FCC gold-amorphous carbon core-shell nanoparticles were observed by using a transmission electron microscopy (TEM), as shown in FIGS. 3C to 3E. In the TEM images, it clearly reveals that the amorphous surface layer has a lattice spacing value of approximately 2 nm, and the FCC gold core has a lattice spacing value of 0.227 nm.

Compared to the traditional methods for the synthesis and deployment of nanoparticles, the present nanosheet-based fabrication method is flexible and highly efficient. The freestanding nanosheets can be easily transferred onto various substrates regardless of their morphology and roughness. The thickness of the metal film can be adjusted in accordance with the deposition time. The size and distribution of the prepared gold-amorphous carbon core-shell nanoparticles can be tuned by varying annealing time and temperature, the thickness of nanosheets and the type of substrate.

In addition, the method can further be extended to form other noble metal-carbon core-shell nanoparticles. For example, the noble metal can be ruthenium (Ru), rhodium (Rh), palladium (Pd), osmium (Os), iridium (Ir), platinum (Pt), gold (Au), and silver (Ag).

Figure 4A:
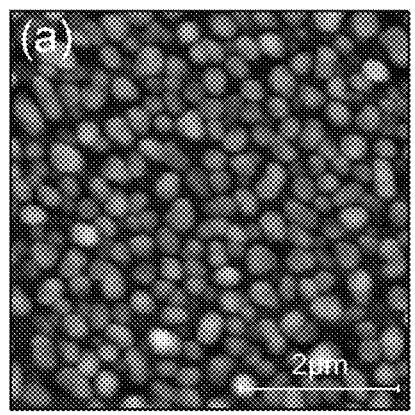
FIG. 4A depicts an AFM image of the nanoparticles obtained via annealing nanosheets (thickness=20 nm) on a silicon substrate at 450° C. for 30 minutes.
Figure 4B:
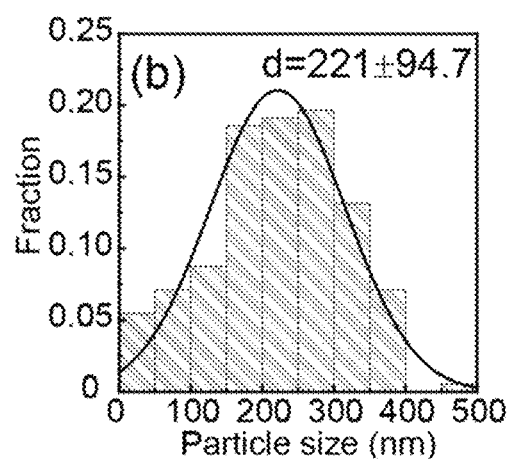
FIG. 4B depicts a size distribution of the nanoparticles obtained from FIG. 4A.
Figure 4C:
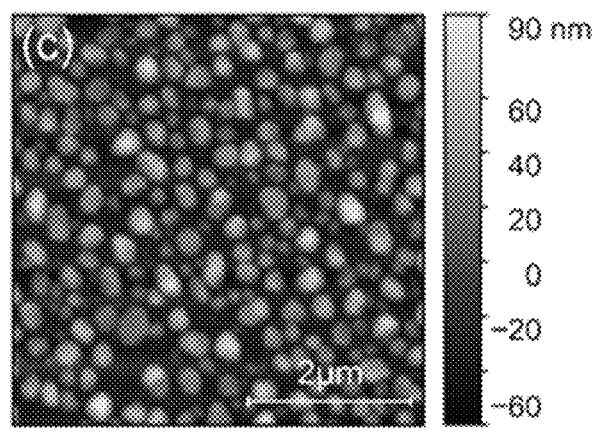
FIG. 4C depicts an AFM image of the nanoparticles obtained via annealing nanosheets (thickness=20 nm) on a silicon substrate at 600° C. for 30 minutes.
Figure 4D:
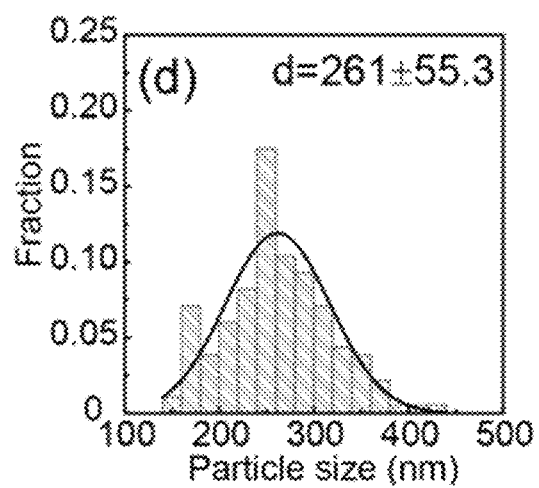
FIG. 4D depicts a size distribution of the nanoparticles obtained from FIG. 4C.
Figure 4E:
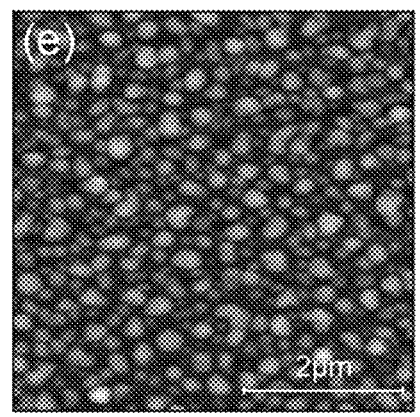
FIG. 4E depicts an AFM image of the nanoparticles obtained via annealing nanosheets (thickness=20 nm) on a silicon substrate at 300° C. for 120 minutes.
Figure 4F:
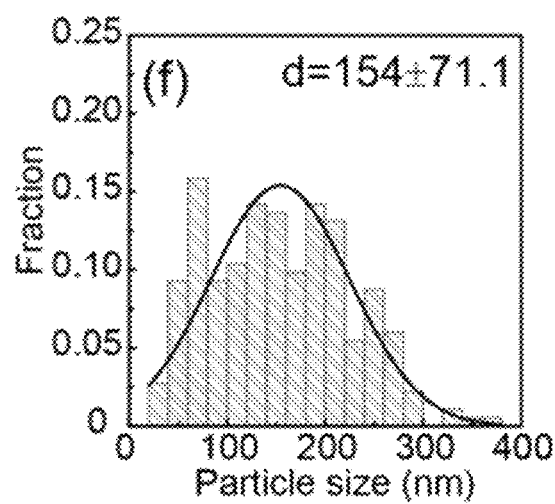
FIG. 4F depicts a size distribution of the nanoparticles obtained from FIG. 4E.

Referring to FIGS. 4A, 4C, 4E, the 20 nm-thick organic-gold nanosheets on the silicon substrates were annealed according to different annealing conditions, such as at 450° C. for 30 minutes, at 600° C. for 30 minutes, or at 300° C. for 120 minutes. The results show that the as-fabricated nanoparticles have a different size distribution, the quantification results were shown in FIGS. 4B (0-500 nm), 4D (100-400 nm) and 4F (0-400 nm).

Figure 5A:
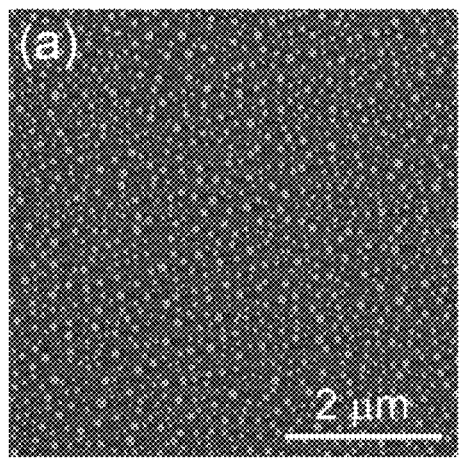
FIG. 5A depicts a SEM image of the nanoparticles obtained via annealing nanosheets (thickness=11 nm) on a sapphire substrate at 600° C. for 30 minutes.
Figure 5B:
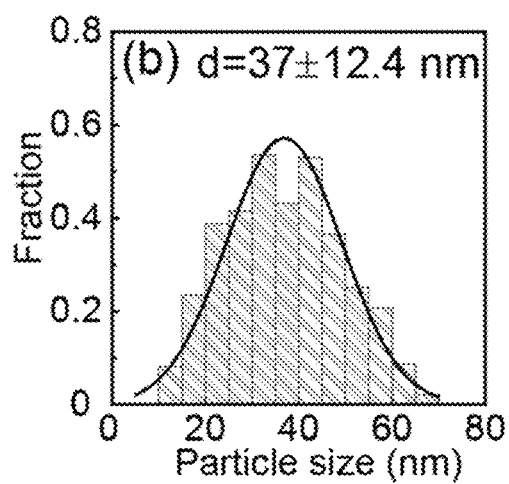
FIG. 5B depicts a size distribution of the nanoparticles obtained from FIG. 5A.
Figure 5C:
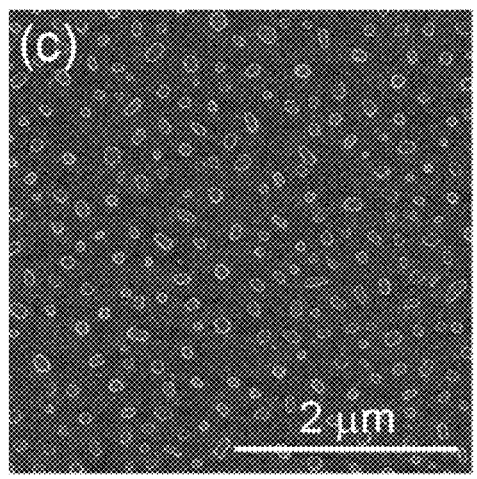
FIG. 5C depicts a SEM image of the nanoparticles obtained via annealing nanosheets (thickness=80 nm) on a sapphire substrate at 600° C. for 30 minutes.
Figure 5D:
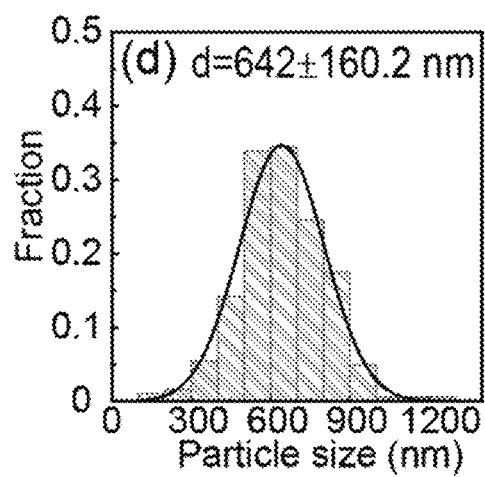
FIG. 5D depicts a size distribution of the nanoparticles obtained from FIG. 5C.

Referring to FIGS. 5A and 5C, different thickness (i.e. 11 nm or 80 nm) organic-gold nanosheets on the sapphire substrates were annealed according to the same annealing conditions of 600° C. for 30 minutes. FIG. 5B shows that the thinner (11 nm) nanosheets on the sapphire substrate have a particle size of approximately 10-70 nm, and FIG. 5D shows that the thicker (80 nm) nanosheets on the sapphire substrate have a particle size of approximately 100-1200 nm.

Figure 6A:
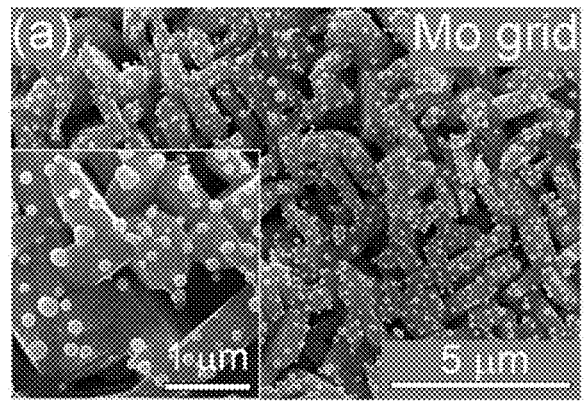
FIG. 6A depicts a SEM image of nanoparticles obtained via annealing nanosheets (thickness=20 nm) on non-planar Mo grid at 600° C. for 30 minutes.
Figure 6B:
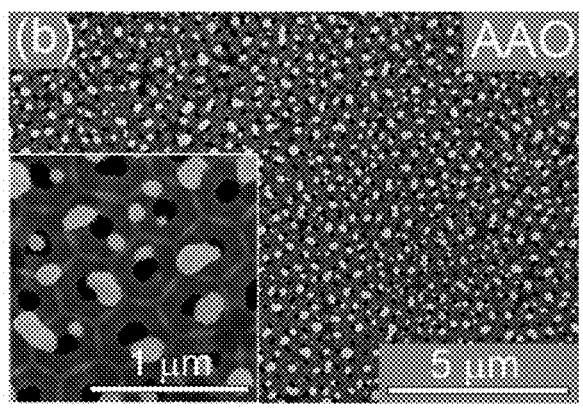
FIG. 6B depicts a SEM image of nanoparticles obtained via annealing nanosheets (thickness=20 nm) on non-planar AAO plate at 600° C. for 30 minutes.

Moreover, the freestanding nanosheets can also be transferred onto non-planar substrates. For example, FIGS. 6A and 6B show the case when 20 nm-thick organic-gold nanosheets on non-planar substrates, such as Mo grid or AAO plate. Both organic-gold nanosheets were annealed according to the same annealing conditions of 600° C. for 30 minutes.

Figure 7:
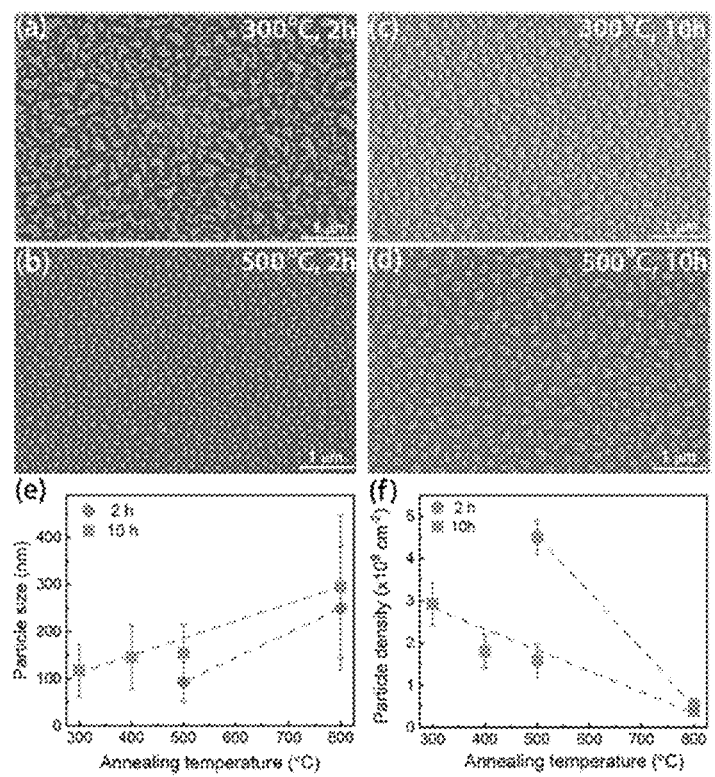
FIG. 7 depicts SEM images of the 25 nm-thick gold-C nanosheets annealed at (a, c) 300° C. and (b, d) 500° C. in air for 2 hours and 10 hours, respectively. (e) shows particle size and (f) shows particle density as a function of annealing temperature and time. The lines drawn through the data points serve as a guide to the eye.

To further understand the formation of nanoparticles, isothermal annealing was performed on the gold-carbon nanosheets (thickness=25 nm) at a variety of temperatures ranging from 300-800° C. As shown in FIG. 7, it can be seen that the nanosheet broke up into tiny fragments after annealing at 300° C. or 500° C. for 2 hours, and was subsequently transformed into nanoparticles after annealing for 10 hours. The general trend is that the longer is the annealing time, the larger is the formed nanoparticle. In the present invention, it also noted that the particle size grew at the expense of their number density ((e), (f) in the FIG. 7), which is similar to a typical Ostwald ripening process. Based on the above results, it is clear that the formation of the nanoparticles is thermodynamically favored after the Au—C nanosheet is decomposed upon heating.

Figure 8A:
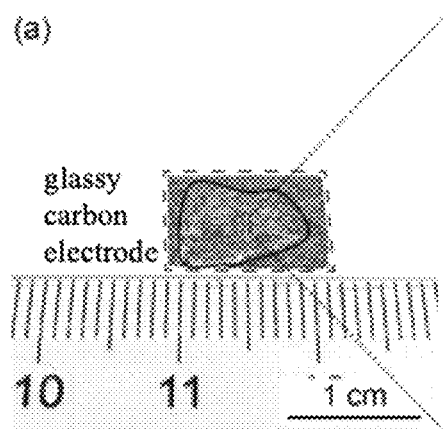
FIG. 8A depicts a photograph of glassy carbon electrode coated by organic-gold membrane.
Figure 8B:
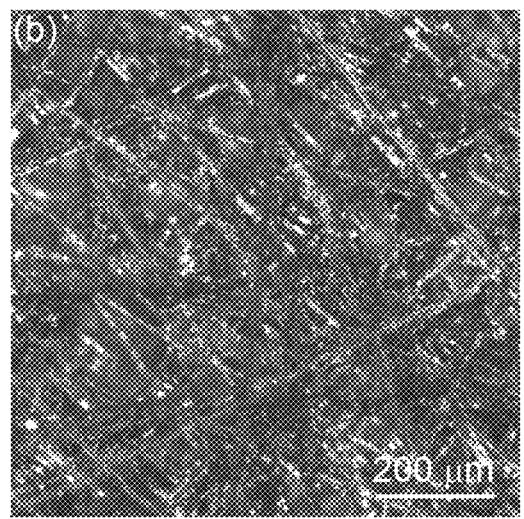
FIG. 8B depicts an optical image of gold-carbon composite coated glassy carbon electrode.

Referring to FIGS. 8A and 8B, a glassy carbon electrode coated with metal-carbon nanoparticles is provided by isothermal annealing of organic-gold membranes. FIG. 8A shows a photography of the glassy carbon electrode coated with organic-gold membrane and metal-carbon composite nanoparticles, and its optical microscope image is shown in FIG. 8B.

Examples

The examples and embodiments described herein are for illustrative purposes only and various modifications or changes in light thereof will be suggested to persons skilled in the art and are included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Fabrication of Metal-Carbon Composite Via Polymer Surface Buckling-Enabled Exfoliation (PSBEE):

First, a polyvinyl alcohol (PVA) hydrogel layer was spin-coated at 1000 rpm for 30 seconds on a square or a circular glass plate with the lateral size of 100 mm Subsequently, the PVA-covered glass substrate was placed in a drying oven for dehydration at 80° C. for 1 hour and air-cooled to room temperature. After that, a gold film was deposited onto the PVA-covered glass substrate via ion beam sputtering at the working pressure of 0.1 Pa and ion beam current of 10 mA. The thickness of the deposited gold film was controlled by varying the deposition time. The deposition of Au onto PVA can lead to the formation of a subsurface Au-organic layer and even partial carbonization of PVA. The subsequent interfacial fracture further facilitates chemical bond breakage and carbonization, eventually leading to the formation of the freestanding carbon-containing gold nanosheet. The presence of amorphous carbon is evident even before exfoliation.

Finally, the Au-PVA-glass system was immersed in water for few minutes. After that, freestanding nanosheets spontaneously delaminated from the PVA. The resulting nanosheets contained two phases, i.e., the Au-rich FCC phase and carbon-rich amorphous phase.

By using the PSBEE, it is able to synthesize freestanding ultrathin carbon-containing metal (hereafter referred to as metal-C) nanosheets, which may have a centimeter in-plane size and thickness down to approximately 10 nm.

Differential Scanning Calorimetry (DSC):

Thermal analysis was performed on the metal-carbon composite via a flash differential scanning calorimetry (DSC) (Flash-DSC 2, Mettler-Toledo, Switzerland). First, the metal-carbon nanosheets were collected in a small plastic tube with DI water. After drying for 8 hours at 60° C., the nanosheets were transferred to glass slides or sapphire substrates for later use. The flash DSC specimens were prepared using the nanosheets, which were transferred from the glass slides or sapphire substrates onto temperature-corrected sensors (MultiSTAR UFS1, Mettler-Toledo, Switzerland) under a stereo microscope. During flash DSC, silicone oil was applied on the chip surface to facilitate heat transfer between the nanosheets and the chip. To further study the thermal stability of the nanosheets, the nanosheets were also heated on the sapphire substrates in the Netzsch DSC system in an argon (Ar) environment at a heating rate of 1° C./s.

Scalable Production of Metal-Carbon Composite:

The metal-carbon nanosheets were transferred to the sapphire substrates. After that, the metal-carbon nanosheets were dried and heated up in a muffle furnace to a target temperature between 300-800° C. at a rate of 10° C./min. Isothermal annealing was then performed for 0.5-10 hours in air to produce metal-carbon nanoparticles.

Structural and Property Characterizations of Metal-Carbon Composite and Nanoparticles Structural characterization was carried out for the metal-carbon composite and nanoparticles by using scanning electron microscopy (SEM) (FEI-Versa 3D Dual Beam) equipped with energy dispersive X-ray spectroscopy (EDS), transmission electron microscopy (TEM) (Tecnai F20), and atomic force microscopy (AFM) (MFP-3D Origin, Oxford Instruments). The surface morphology and thickness of the metal-carbon composite were examined with AFM at a noncontact mode. The Raman spectra were obtained using the Renishaw inVia Raman microscope excited with a laser of a wavelength of 532 nm. The Fourier transform infrared spectra (FTIR) were measured using the Nicolet iN10 MX infrared imaging microscope.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

The invention claimed is:

1. A method for synthesizing a metal-carbon composite of a core-shell structure, comprising:
preparing a first polymer-covered glass substrate with a nano-thickness metal film deposited thereon;
immersing the first polymer-covered glass substrate with the metal film to delaminate one or more 2D freestanding organic-metal nanosheets from the first polymer-covered glass substrate;
transferring the one or more 2D freestanding organic-metal nanosheets onto a second target substrate; and
annealing the one or more 2D freestanding organic-metal nanosheets to decompose an organic portion of the organic-metal nanosheet into an amorphous carbon-containing shell forming a metal-carbon nanocomposite of a core-shell structure.

2. The method of claim 1, wherein the polymer used in the first polymer-covered glass substrate comprises PVA.

3. The method of claim 1, wherein the second target substrate comprises a planar substrate or a non-planar substrate.

4. The method of claim 3, wherein the planar substrate comprises silicon, fused silica, glass, or sapphire.

5. The method of claim 3, wherein the non-planar substrate comprises an anodized alumina oxide (AAO) plate and Mo grid.

6. The method of claim 1, wherein the metal film is a gold (Au) film.

7. The method of claim 1, wherein the method of preparing a first polymer-covered glass substrate with a nano-thickness metal film deposited thereon further comprises:
dissolving a polymer powder into deionized water to form a polymeric hydrogel with the mass fraction of 5% to 15%;
spin-coating the polymeric hydrogel on a glass substrate until the surface of the glass substrate is uniformly covered to obtain a first polymer-covered glass substrate;
placing the first polymer-covered glass substrate in a drying oven for dehydration at 80° C. for 1 hour and air-cooling to room temperature; and
depositing a metal film on the first polymer-covered glass substrate.

8. The method of claim 7, wherein the metal film is deposited on the first polymer-covered glass substrate via a physical vapor deposition method comprising magnetron sputtering, electron beam, ion-beam evaporation and thermal evaporation.

9. The method of claim 8, wherein the thickness of the metal film is in a range of 10 nm to 100 nm.

10. The method of claim 7, wherein the temperature on the first polymer-covered glass substrate is kept below 100° C.

11. The method of claim 1, wherein the method of transferring the one or more 2D freestanding organic-metal nanosheets onto a second target substrate further comprising:
preparing a second target substrate; and
recovering the one or more 2D freestanding organic-metal nanosheets out of the water with the second target substrate.

12. The method of claim 1, wherein the first polymer-covered glass substrate with the metal film is immersed into a fluid comprising deionized water.

13. The method of claim 1, wherein the second target substrate with one or more 2D freestanding organic-metal nanosheets is placed into heating equipment for annealing.

14. The method of claim 13, wherein the heating equipment comprises a muffle furnace.

15. The method of claim 13, wherein the one or more 2D freestanding organic-metal nanosheets are annealed at a heating rate of 10° C./min in the air and cooled down in the heating equipment, and wherein the annealing time is in a range of 30 to 600 minutes, and the annealing temperature is in a range of 300 to 900° C.

16. A metal-carbon composite of a core-shell structure made by the process of claim 1, wherein a metal nanoparticle constitutes a core and an amorphous carbon-containing phase having a thickness of approximately 2 nm or less constitutes a shell, and wherein the shell surrounds a portion or the entirety of the core.

17. The metal-carbon composite of claim 16, wherein the size distribution of the metal-carbon composite of a core-shell structure is in a range of 20 to 800 nm.

18. The metal-carbon composite of claim 16 further comprising an interlayer between the core and the amorphous carbon-containing phase, the interlayer comprising a mixture of the core metal and the amorphous-carbon shell.

19. An electrode or biosensor, having a coating including the metal-carbon composite of a core-shell structure of claim 16.

* * * * *